(12) United States Patent
Matsuda

(10) Patent No.: US 9,742,259 B2
(45) Date of Patent: Aug. 22, 2017

(54) PHASE SEQUENCE SWITCHING DEVICE FOR THREE-PHASE POWER SUPPLY

(71) Applicant: Toshiba Schneider Inverter Corporation, Mie-gun, Mie (JP)

(72) Inventor: Hiromasa Matsuda, Mie (JP)

(73) Assignee: TOSHIBA SCHNEIDER CORPORATION, Mie-Gun, Mie (JP)

(*) Notice: Subject to any disclaimer, the term of this patent is extended or adjusted under 35 U.S.C. 154(b) by 258 days.

(21) Appl. No.: 14/576,144

(22) Filed: Dec. 18, 2014

(65) Prior Publication Data

US 2015/0180327 A1 Jun. 25, 2015

(30) Foreign Application Priority Data

Dec. 25, 2013 (JP) ................. 2013-267054

(51) Int. Cl.

| H01H 19/64 | (2006.01) |
|---|---|
| H02M 1/32 | (2007.01) |
| H01H 47/02 | (2006.01) |
| H02H 7/08 | (2006.01) |
| H02H 7/097 | (2006.01) |
| H02H 11/00 | (2006.01) |

(52) U.S. Cl.
CPC .............. *H02M 1/32* (2013.01); *H01H 47/02* (2013.01); *H02H 7/0805* (2013.01); *H02H 7/097* (2013.01); *H02H 11/002* (2013.01)

(58) Field of Classification Search
CPC .... H02H 7/0805; H02H 7/097; H02H 11/002; H01H 47/02; H02M 1/32
USPC ........................................................ 307/113
See application file for complete search history.

(56) References Cited

U.S. PATENT DOCUMENTS

| 3,798,929 A | * | 3/1974 | Balgalvis ............... | D04B 15/38 |
| | | | | 242/364.7 |
| 4,163,270 A | * | 7/1979 | Marus .................. | H02H 11/004 |
| | | | | 318/289 |
| 4,196,378 A | * | 4/1980 | Shirai .................. | H02H 11/004 |
| | | | | 318/438 |

FOREIGN PATENT DOCUMENTS

| CN | 1367561 | 9/2002 | |
| CN | 1848582 | 10/2006 | |
| DE | 3421828 A1 * | 6/1984 | .......... H02H 11/002 |

(Continued)

OTHER PUBLICATIONS

English Language Abstract and Translation of JP 2008-187819 published on Aug. 14, 2008.

(Continued)

*Primary Examiner* — Jared Fureman
*Assistant Examiner* — Duc M Pham
(74) *Attorney, Agent, or Firm* — DLA Piper LLP US

(57) ABSTRACT

A phase sequence switching device for a three-phase power supply is disposed in a power feed path from a three-phase power supply to a load and includes a power-supply side relay including two Form C contact relays connected to two phases of the power supply respectively, a load side relay including two Form C contact relays connected between the power-supply side relay and the load, and a switching circuit connected between the power-supply side relay and the load side relay and wired to be capable of switching by a relay action from a standby state where no power is supplied to the load to either a state where the power supply is connected to a positive phase so that power is supplied to the load side or a state where the power supply is connected to a reverse phase so that power is supplied to the load side.

5 Claims, 6 Drawing Sheets

(56) References Cited

FOREIGN PATENT DOCUMENTS

| | | |
|---|---|---|
| JP | 2008/187819 | 8/2008 |
| RU | 2022287 | 10/1994 |
| RU | 2025354 | 12/1994 |

OTHER PUBLICATIONS

Chinese Office Action (with English Translation) issued in CN 201410818167.9 dated Oct. 8, 2016.
English Language Abstract of RU 2025354 published Dec. 30, 1994.
English Language Translation of RU 2022287 published Oct. 30, 1994.
English Language Abstract and English Language Translation of CN 1367561 published Sep. 4, 2002.
English Language Abstract and English Language Translation of CN 1848582 published Oct. 18, 2006.

* cited by examiner

DURING NON-OPERATING (OFF)

DURING OPERATION (ON)

US 9,742,259 B2

PHASE SEQUENCE SWITCHING DEVICE FOR THREE-PHASE POWER SUPPLY

CROSS-REFERENCE TO RELATED APPLICATIONS

This application is based upon and claims the benefit of priority from the prior Japanese Patent Application No. 2013-267054 filed on Dec. 25, 2013, the entire contents of which are incorporated herein by reference.

FIELD

Embodiments described herein relate to a phase sequence switching device for a three-phase power supply.

BACKGROUND

An inverter device connected to a three-phase power supply in use is provided with a fan which serves to cool the inverter device and which is designed to be fed with electrical power directly from the three-phase power supply. In this case, there is a possibility of error in a phase sequence when the three-phase power supply is connected to power-supply terminals for the fan. Upon occurrence of erroneous connection, the fan is reverse rotated with the result of reduction in a cooling efficiency. In view of this problem, a switching circuit is conventionally provided in addition to a power-supply switch. The switching circuit is capable of detecting and switching a phase sequence.

In the conventional switching circuit, however, there is a possibility of interphase short circuit of the three-phase power supply depending upon a state of the circuit when a relay used for switching the phase sequence malfunctions or causes welding or the like due to oscillation or noise.

DETAILED DESCRIPTION

In general, according to one embodiment, a phase sequence switching device for a three-phase power supply is disposed in a power feed path from a three-phase power supply to a load. The device includes a power-supply side relay, a load side relay and a switching circuit. The power-supply side relay includes two Form C contact relays connected to two phases of the three-phase power supply respectively. The load side relay includes two Form C contact relays connected between the power-supply side relay and the load. The switching circuit is connected between the power-supply side relay and the load side relay and wired to be capable of switching by a relay action from a standby state where no power is supplied to the load to either a state where the three-phase power supply is connected to a positive phase so that power is supplied to the load side or a state where the three-phase power supply is connected to a reverse phase so that power is supplied to the load side.

Figure 1:
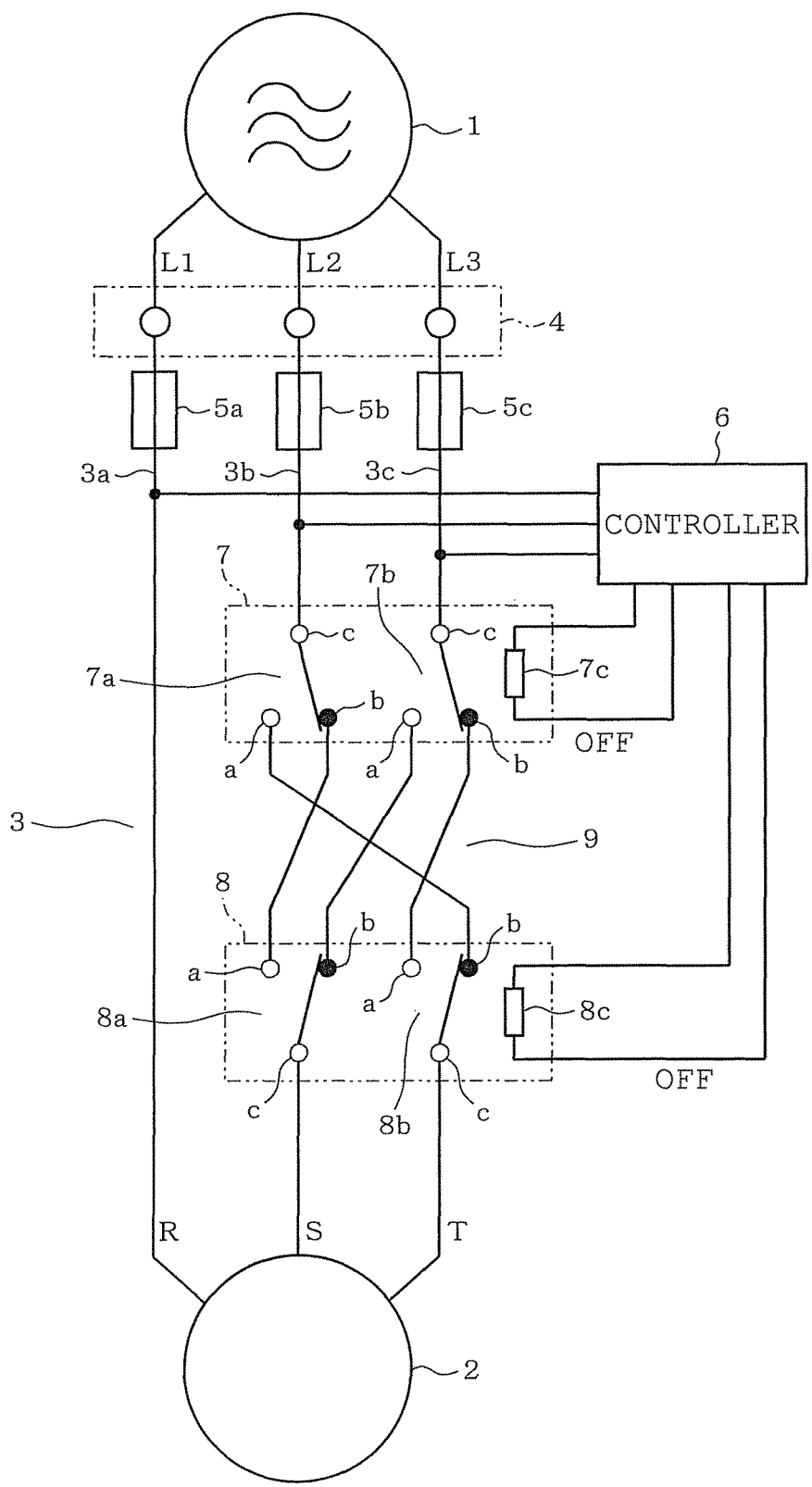
FIG. 1 is a circuit diagram showing an electrical arrangement including a phase sequence switching device according to a first embodiment.

A first embodiment will be described with reference to FIGS. 1 to 3, 6A and 6B. Referring to FIG. 1, an electrical arrangement is shown which includes a phase sequence switching device of the first embodiment. In the arrangement, a load connected to a three-phase power supply 1 is a three-phase electric motor 2 configuring a cooling fan of an inverter device. The motor 2 is connected via a phase sequence switching device 3 to the power supply 1. The power supply 1 has three-phase lines L1 to L3 connected to terminals of a terminal block 4 respectively. The terminals of the terminal block 4 are also connected via fuses 5a, 5b and 5c to power supply lines 3a, 3b and 3c respectively. A controller 6 is configured to detect phase voltages of the power supply lines 3a to 3c to carry out switching control of phase sequence as will be described in detail later. The controller 6 includes a phase sequence detection circuit and a relay drive circuit both of which are provided for performing switching control of phase sequence, although neither circuit is shown.

The power supply line 3a is directly connected to an R-phase terminal of the motor 2. The other power supply lines 3b and 3c are connected to a power-supply side relay 7. A load side relay 8 is provided at the motor 2 side and connected to an S-phase terminal and a T-phase terminal of the motor 2. A switching circuit 9 is connected between the relays 7 and 8.

The relay 7 includes two Form C contact relays (transfer relays) 7a and 7b and a relay coil 7c. The Form C contact relays 7a and 7b include normally open contacts a, normally closed contacts b and traveling contacts c respectively. The power supply lines 3b and 3c are connected to the traveling contacts c of the relays 7a and 7b respectively. The load side relay 8 includes two Form C contact relays 8a and 8b and a relay coil 8c. The Form C contact relays 8a and 8b include normally open contacts a, normally closed contacts b and traveling contacts c respectively. The traveling contacts c of the relays 8a and 8b are connected to the S-phase and T-phase terminals of the motor 2 respectively.

The switching circuit 9 connects the contacts of the relay 7 and the contacts of the relay 8 in the following manner. The normally closed contacts b of the relays 7a and 7b are connected to the normally open contacts a of the relays 8a and 8b respectively. On the other hand, the relays 7a and 7b have normally open contacts a connected to normally closed contacts b of the relays 8b and 8a respectively.

When the relay coil 7c is non-energized, the normally open contacts a of the relays 7a and 7b of the power-supply side relay 7 are open and the normally closed contacts b of the relays 7a and 7b are electrically conducted with the traveling contacts c of the relays 7a and 7b respectively. Further, upon energization of the relay coil 7c, the normally open contacts a of the relays 7a and 7b are switched to be electrically conducted with the traveling contacts c of the relays 7a and 7b with the result that the normally closed contacts b are opened, respectively. Regarding the load side relay 8, too, the relays 8a and 8b are operable in the same manner as described above by switching the relay coil 8c between a non-energized state and an energized state.

Figure 6A:
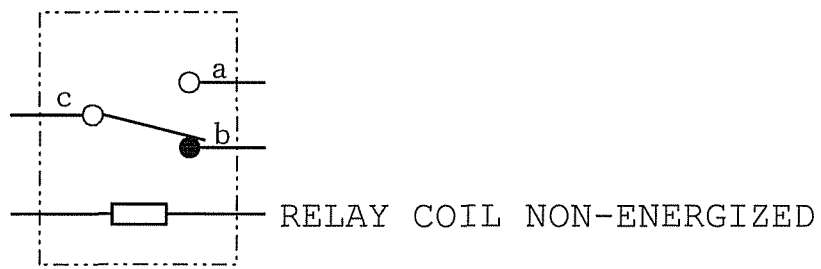
FIGS. 6A and 6B are diagrammatic views explaining an operation of a Form C contact relay.
Figure 6B:
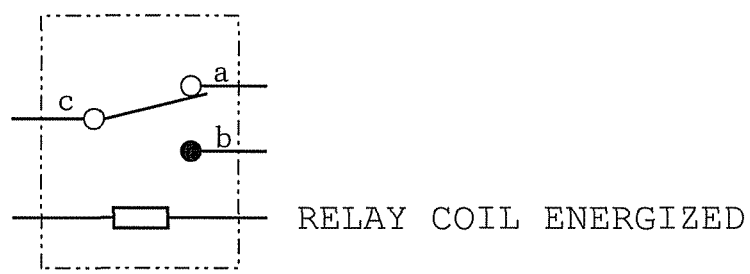

The load side relay 8 functions as a positive phase power-supply switch, and the power-supply side relay 7 functions as a reverse phase power-supply switch in the above-described arrangement. Further, the Form C contact relays 7a, 7b, 8a and 8b used in the foregoing arrangement are non-operating (OFF) when the relay coils 7c and 8c are not energized (unenergized), as shown in FIG. 6A. In this case, the traveling contacts c are in contact with the respective normally closed contacts b, so that the normally open contacts a are open. The relays 7a, 7b, 8a and 8b are operating (ON) when the relay coils 7c and 8c are energized, as shown in FIG. 6B. At this time, the traveling contacts c are brought into contact with the normally open contacts a and the normally closed contacts b are open, respectively.

The working of the above-described configuration will be described with reference to FIGS. 2 and 3 as well as FIG. 1. When the power-supply lines L1 to L3 of the three-phase power supply 1 are connected to the terminal block 4, the controller 6 of the phase sequence switching device 3 detects voltages between the connected phase lines L1 to L3 thereby to determine whether or not the phase lines are connected in a correct phase sequence. The controller 6 determines to execute the positive phase power-supply when the three-phase power-supply lines L1 to L3 connected to the terminal block 4 correspond to the respective terminals R, S and T of the three-phase motor 2 as the result of voltage detection. Further, the controller 6 determines to execute the reverse phase power-supply when the three-phase power-supply lines L1 to L3 connected to the terminal block 4 have reverse phases to the respective terminals R, S and T of the three-phase motor 2 as the result of voltage detection.

When driving the motor 2 to operate (ON) the fan, the controller 6 controls drive of the power-supply side or load side relay 7 or 8 in a manner as shown in the following TABLE 1, based on the foregoing determination:

TABLE 1

| Operation of motor 2 | Power-supply side relay 7 | Load side relay 8 |
| --- | --- | --- |
| Stop (standby state) | OFF | OFF |
| Rotation (positive-phase energization) | OFF | ON |
| Rotation (reverse-phase energization) | ON | OFF |
| (Abnormal state) | (ON) | (ON) |

In TABLE 1, the abnormal state refers to a case where both relays 7 and 8 are in an ON state due to oscillation, noise, failure of contact operation or the like. The power supply can be prevented from an occurrence of short-circuited state in an abnormal condition as denoted above.

Figure 2:
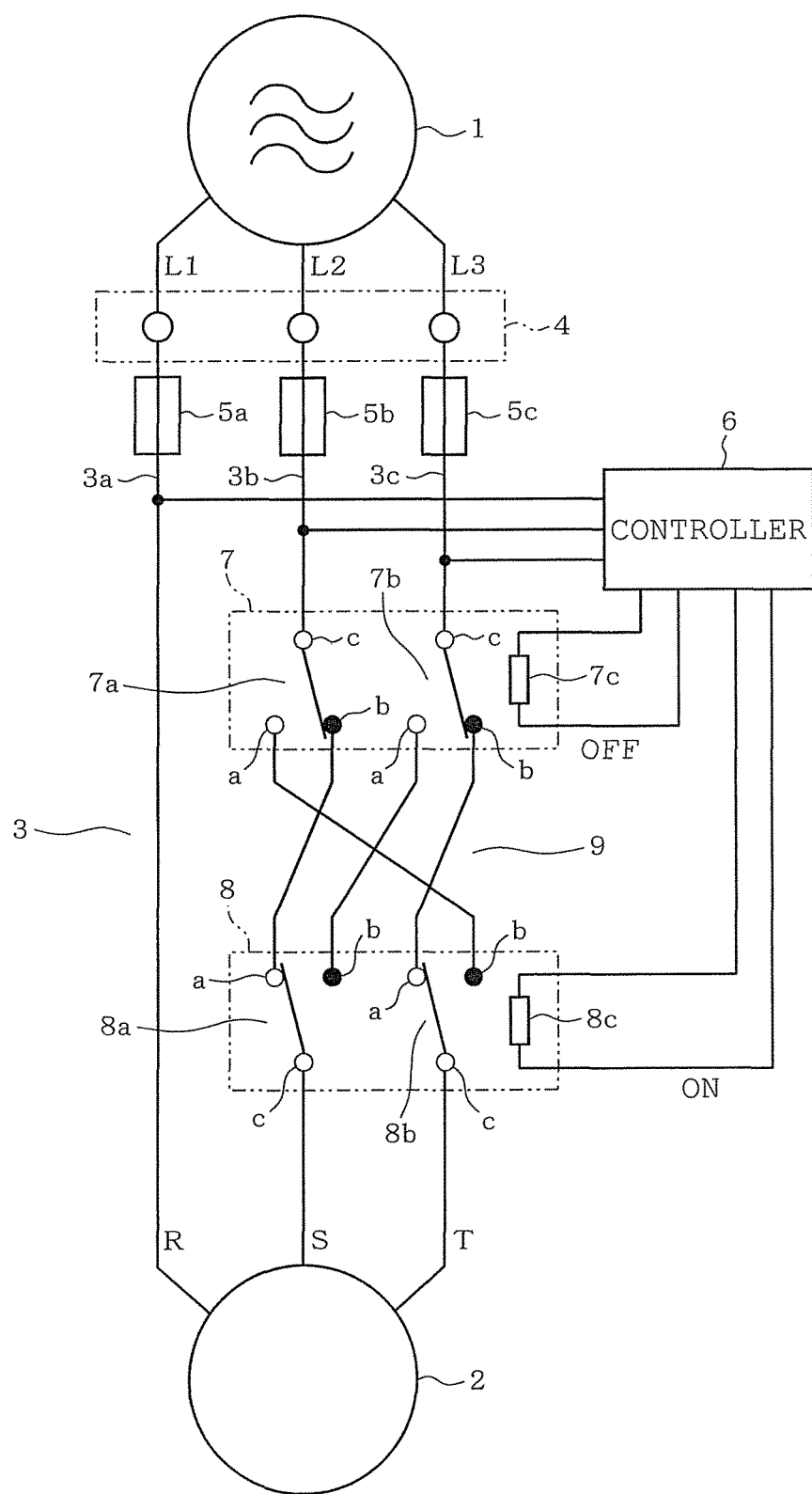
FIG. 2 is a circuit diagram showing an electrical arrangement in a state of positive phase connection.

FIG. 2 shows a case where the load side relay 8 is controlled to be turned on by the controller 6 so that the controller 6 performs the positive phase power supply to the motor 2. The controller 6 supplies an ON signal to the relay coil 8c. The relays 8a and 8b of the load side relay 8 are simultaneously turned on so that the traveling contacts c are switched to electrically conduct the normally open contacts a respectively. The power supply lines L2 and L3 of the three-phase power supply 1 are connected to the terminals S and T of the motor 2 respectively with the result that electrical power is supplied from the power supply 1 to the motor 2. The motor 2 is thus rotated in the normal rotational direction so that the fan blows air against the inverter.

Figure 3:
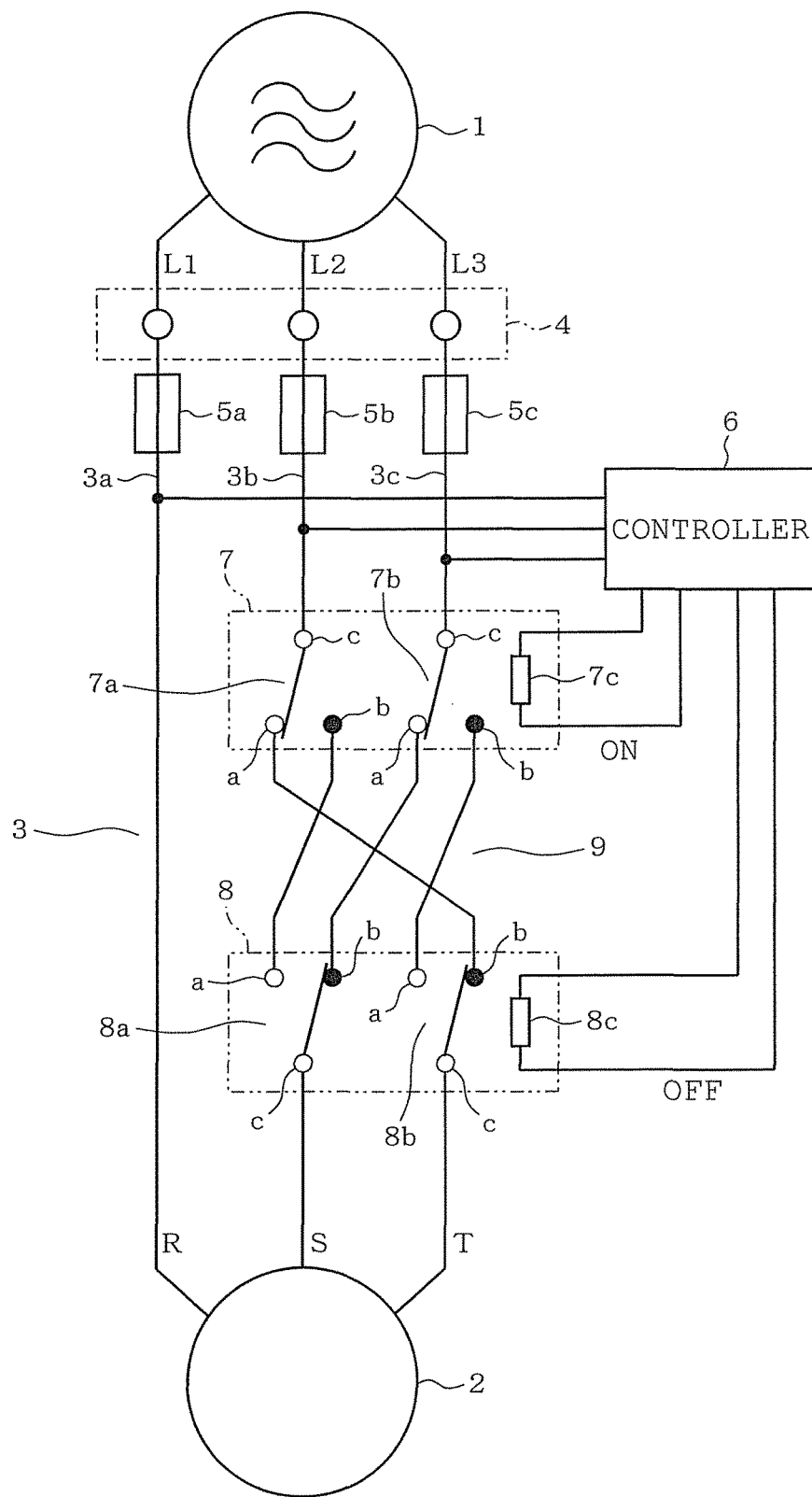
FIG. 3 is a circuit diagram showing an electrical arrangement in a state of reverse phase connection.

On the other hand, FIG. 3 shows another case where the power-supply side relay 7 is controlled to be turned on so that the controller 6 performs the reverse phase power supply to the motor 2. The controller 6 supplies an ON signal to the relay coil 7c. The relays 7a and 7b of the power-supply side relay 7 are simultaneously turned on so that the traveling contacts c are switched to electrically conduct the normally open contacts a respectively. The power supply lines L2 and L3 of the power supply 1 are switched by the switching circuit 9 to be connected to the terminals T and S of the motor 2 respectively with the result that electrical power is supplied from the power supply 1 to the motor 2 in a phase reverse to the state where the power supply 1 is connected to the terminal block 4. The motor 2 is thus rotated in the normal rotational direction so that the fan blows air against the inverter.

The relays 7 and 8 can be simultaneously in an ON state in the occurrence of malfunction due to oscillation or the like but not by the control of the controller 6. Even in this case, however, the motor 2 can be operated in a safe state without occurrence of interphase short circuit in which the power supply lines L2 and L3 are short circuited.

Further, even upon occurrence of welding of the relay contacts or the like in either one or both of the relays 7 and 8, occurrence of interphase short circuit can be prevented irrespective of energization of the relay coil 7c or 8c. A case can occur where two-phase (single-phase) energization is carried out for the three-phase motor 2 in some situations. Even in this case, however, occurrence of interphase short circuit can be prevented. Further, although a rotational state of the motor 2 is not normal in this case, a temperature detection thermistor is incorporated in the inverter. Accordingly, a protecting function works against unusual temperature even when malrotation of the fan reduces the cooling performance.

The above-described first embodiment can achieve the following advantageous effects. The power-supply lines 3b and 3c are connected to the power-supply side relay 7 having the Form C contact relays 7a and 7b and the load side relay 8 having the Form. C contacts 8a and 8b. The switching circuit 9 is connected between the relays 7 and 8. As a result, the interphase short circuit of the three-phase power supply 1 can be prevented even when either relay 7 or 8 is on-off operated in any manner. This can prevent occurrence of disconnection of the fuses 3a to 3c due to short-circuit currents in the trouble of relay switching control.

Further, in any case where the power-supply lines L1 to L3 of the power supply 1 are connected to the terminal block 4 in a positive phase connection state or in a reverse phase connection state, the motor 2 can be operated in a predetermined rotating direction when either relay 7 or 8 is operated. This requires no configuration of providing a power-supply on-off relay in addition to the relays which switch the phase sequence. Further, either relay 7 or 8 can be operated in an easy manner in a short time without operating a plurality of relays. Still further, the configuration in which two relays 7 and 8 having the same specification are used has an advantageous effect of commonalizing components and reducing the number of types of components.

Although the power-supply side relay 7 and the load side relay 8 are configured to be used as the reverse-phase power-supply switch and the positive-phase power-supply switch respectively in the foregoing embodiment, the power-supply side relay 7 may be used as a positive-phase power-supply switch and the load side relay 8 may be used as a reverse-phase power-supply switch contrary to the foregoing embodiment by modifying the connection of the switching circuit 9.

Figure 4:
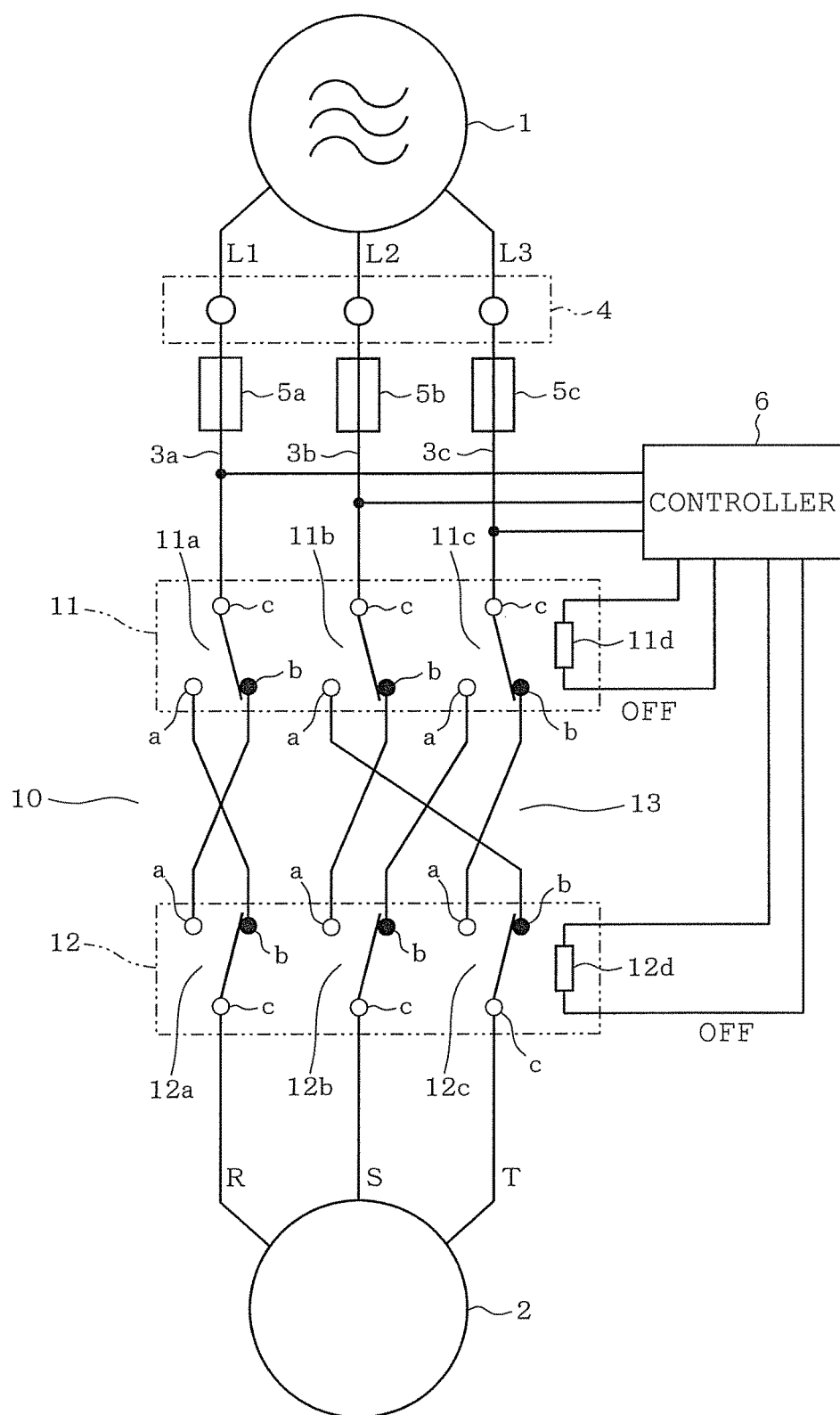
FIG. 4 is a circuit diagram similar to FIG. 1, showing a second embodiment.
Figure 5:
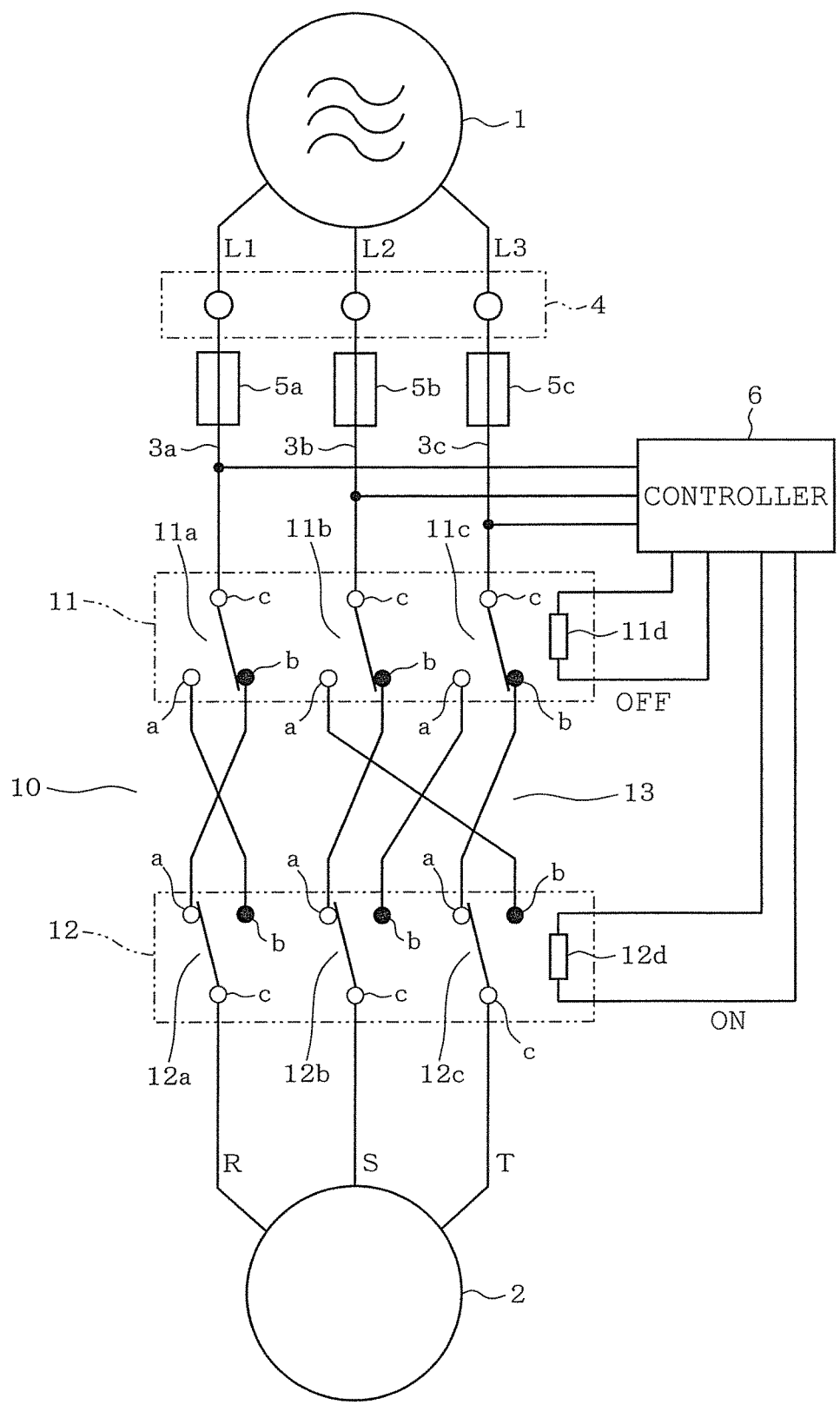
FIG. 5 is a circuit diagram showing an electrical arrangement in a state of positive phase connection.

FIGS. 4 and 5 illustrate a second embodiment. Only the differences between the first and second embodiments will be described here. The second embodiment differs from the foregoing embodiment in that a Form C contact relay is additionally provided on the power-supply line 3a. Accordingly, the phase sequence switching device 10 includes the power-supply side relay 11, the load side relay 12 and the switching circuit 13, instead of the power-supply side relay 7, the load side relay 8 and the switching circuit 9.

Referring to FIG. 4, the power-supply side relay 11 includes three Form C contact relays 11a to 11c and a relay coil 11d for on-off controlling the relays 11a to 11c respectively. The load side relay 12 includes three Form C contact relays 12a to 12c and a relay coil 12d on-off controlling the relays 12a to 12c. The relays 11b and 11c correspond to the relays 7a and 7b of the power-supply side relay 7 in the first embodiment respectively. The relays 12b and 12c correspond to the relays 8a and 8b of the load side relay 8 in the first embodiment respectively. The relay coils 11d and 12d correspond to the relay coils 7c and 8c respectively.

The relays 11a and 12a are disposed to correspond to the power-supply side and the load side by cutting the power-supply line 3a. The switching circuit 13 includes parts corresponding to the power-supply lines 3b and 3c, and the connection structures of these parts are the same as those in the switching circuit 9. A part corresponding to the power-supply line 3a has a connection structure in which the normally open contact a of one of the relays 11a and 12a is connected to the normally closed contact b of the other relay 12a or 11a in the relays 11a and 12a respectively.

In the above-described configuration, the load side relay 12 functions as a positive phase power-supply switch in the same manner as in the first embodiment, and the power-supply side relay 11 functions as a reverse phase power-supply switch in the same manner as in the first embodiment.

The working of the above-described configuration will be described with reference to FIG. 5. When the power-supply lines L1 to L3 of the three-phase power-supply 1 are connected to the terminal block 4, the controller 6 of the phase sequence switching device 10 detects voltages between the connected phase lines L1 to L3 thereby to determine whether or not the phase lines are connected in a correct phase sequence. The controller 6 determines to execute the positive phase power-supply when the three-phase power-supply lines L1 to L3 connected to the terminal block 4 correspond to the respective terminals R, S and T of the three-phase motor 2 as the result of voltage detection. Further, the controller 6 determines to execute the reverse phase power-supply when the three-phase power-supply lines L1 to L3 connected to the terminal block 4 have reverse phases to the respective terminals R, S and T of the three-phase motor 2 as the result of voltage detection.

When driving the motor 2 to operate (ON) the fan, the controller 6 controls drive of the power-supply side or load side relay 11 or 8 in a manner as shown in the following TABLE 2, based on the foregoing determination:

TABLE 2

| Operation of motor 2 | Power-supply side relay 11 | Load side relay 12 |
|---|---|---|
| Stop (standby state) | OFF | OFF |
| Rotation (positive-phase energization) | OFF | ON |
| Rotation (reverse-phase energization) | ON | OFF |
| (Abnormal state) | (ON) | (ON) |

In TABLE 2, an abnormal state refers to a case where both relays 11 and 12 are in an ON state due to oscillation, noise, failure of contact operation or the like. The power supply can be prevented from an occurrence of short-circuited state in an abnormal condition as denoted above.

FIG. 5 shows a case where the load side relay 12 is controlled to be turned on by the controller 6 so that the positive-phase power supply is executed for the motor 2. The controller 6 supplies an ON signal to the relay coil 12d. The relays 12a, 12b and 12c of the load side relay 12 are simultaneously turned on so that the traveling contacts c are switched to electrically conduct the normally open contacts a respectively. The power supply lines L1, L2 and L3 of the three-phase power supply 1 are connected to the terminals R, S and T respectively. As a result, the power supply 1 is connected to the motor 2 in the positive phase. The motor 2 is connected to the power supply 1 in a normal state, whereby the motor 2 is rotated in a normal rotating direction so that the fan carries out a blowing operation.

On the other hand, when determining that electrical power be supplied to the motor 2 in the reverse phase, the controller 6 supplies an ON signal to the relay coil 11d to turn on the relay 11 although this control manner is not shown. In this case, the relays 12a, 12b and 12c of the power supply side relay 12 are simultaneously turned on so that the traveling contacts c are switched to electrically conduct the normally open contacts a respectively. The power supply line L1 is connected to the terminal R of the motor 2, and the power supply lines L2 and L3 cross each other in the switching circuit 13 to be connected to the terminals T and S of the motor 2 respectively. As a result, the power supply 1 is connected to the motor 2 in the phase reverse to the connected state of the power supply lines L2 and L3 with the result that electrical power is supplied to the motor 2 in the reverse phase. The motor 2 is connected to the power supply 1 in a normal state, whereby the motor 2 is rotated in a normal rotating direction so that the fan carries out a blowing operation.

The relays 11 and 12 can be simultaneously in an ON state in the occurrence of malfunction due to oscillation or the like but not by the control of the controller 6. Even in this case, however, the motor 2 can be operated in a safe state without occurrence of interphase short circuit in which the power supply lines L2 and L3 are short circuited.

Further, even when welding of the relay contacts or the like occurs and the relays are held in the ON state irrespective of turn-off of the relay operation, a case can occur where two-phase (single-phase) energization is carried out in the motor 2. Even in this case, however, occurrence of interphase short circuit can be prevented.

The second embodiment described above can achieve the same working and effects as those in the first embodiment. Further, the relays 11 and 12 are provided with the Form. C contact relays 11a and 12a corresponding to the power supply line 3a. Accordingly, all the power-supply lines to the motor 2 can be turned to the OFF state when the motor 2 is not energized. As a result, even when an external motor 2 is outside the inverter chassis, for example, electrical power from the three-phase power supply 1 can be prevented from being applied to any of the terminal R, S or T of the motor 2 during stop of the motor 2.

Although the power-supply side relay 11 and the load side relay 12 are configured to be used as the reverse-phase power-supply switch and the positive phase power-supply switch respectively in the foregoing embodiment, the power-supply side relay 11 may be used as a positive phase power-supply switch and the load side relay 12 may be used as a reverse-phase power-supply switch contrary to the foregoing embodiment by reversing the connection of the switching circuit 13.

The foregoing embodiments may be modified as follows. Although the phase sequence switching device is applied to the three-phase motor 2 rotating the fan as the load in each foregoing embodiment, the device may be applied to any load driven by the three-phase power supply.

The phase sequence switching device may be applied to any configuration provided with a separate power-supply on-off switch.

The phase sequence switching device is configured to perform phase sequence switching in each foregoing embodiment while the power-supply side relay and the load side relay serve also as the power-supply on-off switches. In the case where the phase sequence switching device is configured to have a separate power-supply on-off switch, the switching circuit may be connected so that a positive-phase power supply can be carried out while both power-supply side and load side relays are in an off-state.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A phase sequence switching device for a three-phase power supply, which is provided in a power feed path from a three-phase power supply to a load, the device comprising:
    a power-supply side relay including two Form C contact relays connected to two phases of the three-phase power supply respectively;
    a load side relay including two Form C contact relays connected between the power-supply side relay and the load; and
    a switching circuit connected between the power-supply side relay and the load side relay and wired to be capable of switching by a relay action from a standby state where no power is supplied to the load to either a state where the three-phase power supply is connected to a positive phase so that power is supplied to the load side or a state where the three-phase power supply is connected to a reverse phase so that power is supplied to the load side.

2. The device according to claim 1, wherein the switching circuit supplies the three-phase power to the load in a positive phase connection when one of the power-supply side relay and the load side relay carries out a relay action, and the switching circuit supplies the three-phase power to the load in a reverse phase connection when the other relay carries out a relay action.

3. The device according to claim 2, further comprising a controller configured to detect phase voltages of the three-phase power supply and to cause the power-supply side relay or the load side relay to carry out the relay action so that the detected phase voltages correspond to a current carrying direction required of the load.

4. The device according to claim 3, wherein the power-supply side relay and the load side relay have respective Form C contact relays corresponding to the remaining phase of the three-phase power supply, and the switching circuit is wired between the Form C contact relays provided in the remaining phase so that the remaining phase of the three-phase power supply is connected to the load when one of the power-supply side and load side relays is operated and so that the remaining phase of the three-phase power supply is disconnected from the load when both relays are in an off-state or both relays are operated.

5. The device according to claim 2, wherein the power-supply side relay and the load side relay have respective Form C contact relays corresponding to the remaining phase of the three-phase power supply, and the switching circuit is wired between the Form C contact relays provided in the remaining phase so that the remaining phase of the three-phase power supply is connected to the load when one of the power-supply side and load side relays is operated and so that the remaining phase of the three-phase power supply is disconnected from the load when both relays are in an off-state or both relays are operated.

* * * * *